Patented May 30, 1939

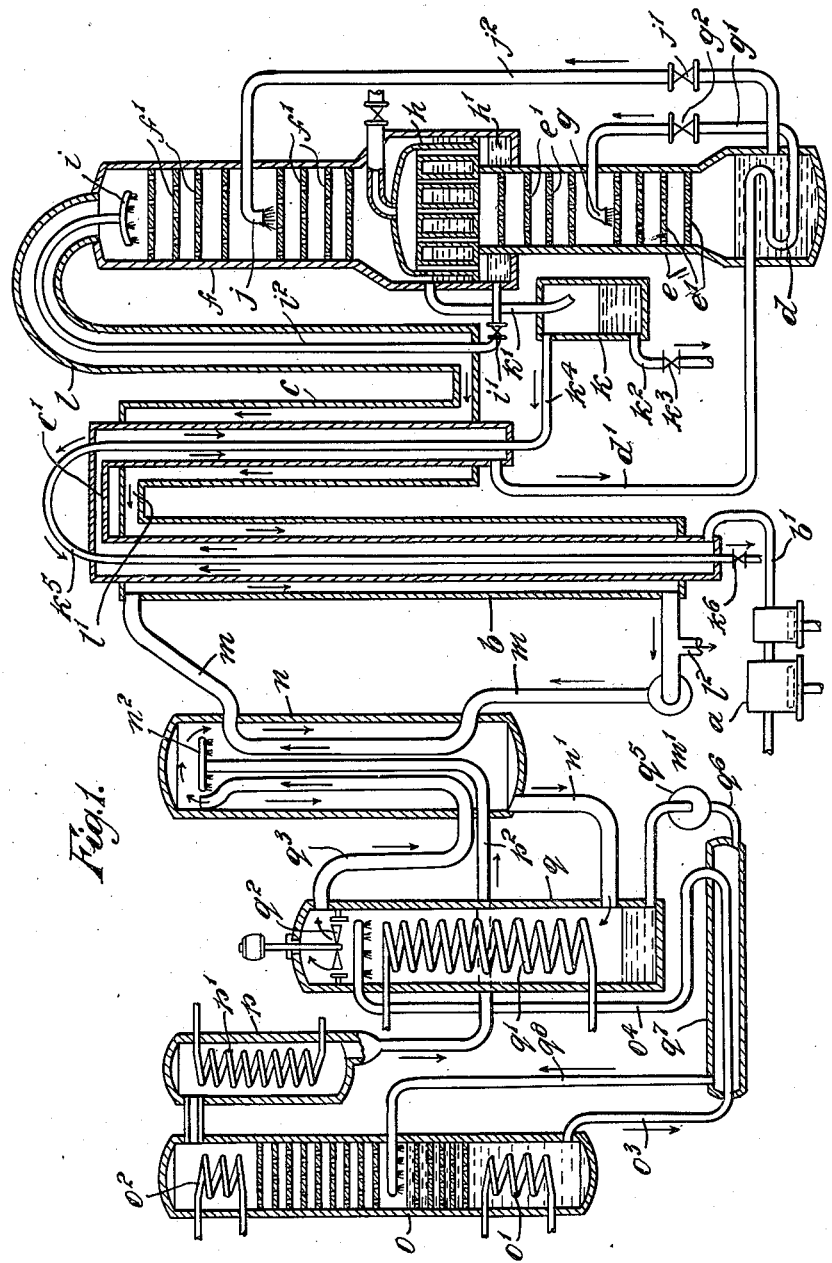

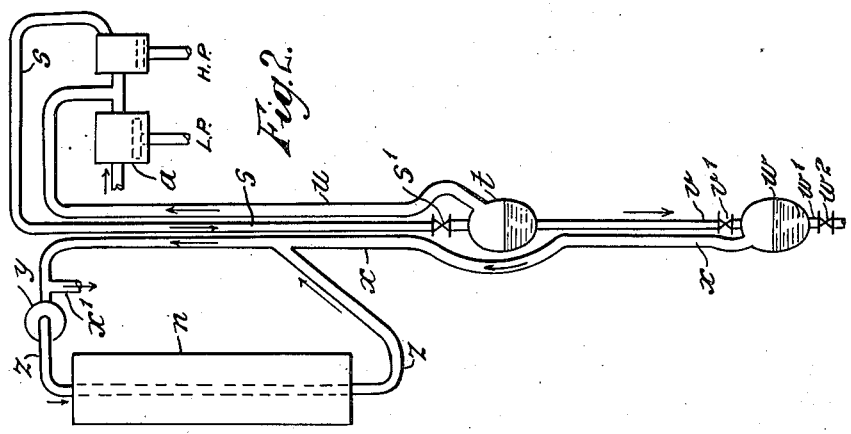

2,160,077

UNITED STATES PATENT OFFICE 2,160,077

PRODUCTION OF LIQUID AIR, AND THE PRODUCTION OF OXYGEN THEREFROM, AND THE LIQUEFACTION AND SEPARATION OF OTHER GASES

Guido Maiuri, London, England

Application September 9, 1936, Serial No. 99,902
In Great Britain September 18, 1935

3 Claims. (Cl. 62—175.5)

This invention relates to the production of liquid air by compression and expansion of air, and also to the production of oxygen by rectification of the liquefied air and the liquefaction and separation of other gases having low liquefaction temperatures.

The main object of the invention is to render the production of liquid air by compression and expansion and the production of oxygen therefrom, more economical than hitherto.

In the production of liquid air by compression and expansion and the production of oxygen therefrom by rectification, the nitrogen gas and oxygen gas evaporating from the liquid nitrogen and oxygen are passed through a heat-exchanger in contra-flow with the compressed air and exert a cooling effect thereon, as is likewise the unliquefied air after expansion in the production of liquid air alone.

In some modern plants before traversing the heat-exchanger, the compressed air traverses a refrigerating apparatus wherein cold is produced at approximately a single temperature by the evaporation of a refrigerant liquid.

Now owing to the quantity of gas which after expansion flows through the heat-exchanger, being less by the amount of oxygen or air abstracted in the liquid condition from the plant, than the quantity of the compressed air which traverses the heat-exchanger, and also owing to the specific heat of the expanded gas being less than the specific heat of the compressed air, there must always be a substantial temperature difference between the expanded gas and the compressed air to enable the former to cool the latter, the quantity of heat which the expanded gas is capable of absorbing being only a fraction of that which the compressed air must lose or gain for the same variation of temperature.

Moreover, with an ordinary refrigerating apparatus wherein cold is produced at approximately a single temperature by the evaporation of a refrigerant liquid, there will be a temperature difference between the compressed air and the refrigerant, which decreases from being very considerable at the inlet for the compressed air.

For the above reasons the heat-exchanger and the refrigerating apparatus cannot cool the compressed air in the most economical manner, namely with an extremely small temperature difference between the cooling agents and the compressed air.

More particularly the main object of the invention is to provide in a liquid air or oxygen rectification plant, contra-flow heat-exchange wherein the temperature difference between the contra-flowing expanded gas and the compressed air is extremely small, merely sufficient to effect heat transmission, or in which the temperature difference depends solely upon the rate of heat transmission.

For the above purpose, according to the invention, in the production of liquid air or oxygen by the compression and expansion of air, the cooling of the compressed air by contra-flow heat-exchange with the expanded gas, is supplemented by conjoint contra-flow heat-exchange along a progressive range of temperatures with an extraneous evaporating refrigerant or a medium cooled by such refrigerant to such extent that the contra-flow heat-exchange occurs with small temperature difference throughout the range. The fact that all the cold supplied by the supplementary cooling does not have to be supplied at the lowest temperature, but between the lowest and nearly atmospheric temperatures, makes the production of the cold much cheaper. For instance, a range of cold extending progressively between —115° C. and +15° C. would cost approximately the same as the same quantity of cold at —50° (the average temperature) although such a low temperature as —115° C. is obtained at one end of the range.

The supplementary cooling medium may be gas cooled to the temperature of a suitable point of the contra-flow heat-exchange, and introduced in sufficient quantity into or alongside the expanded gas, contra-flowing with the compressed air, so to supplement the cooling effect thereof that the temperature difference from the compressed air at the point of introduction can be very small. This supplementary cooled gas may be some of the expanded gas which has already traversed the heat-exchanger, but which instead of being allowed to escape is re-cooled by the evaporator of a refrigerating machine and again passed through the heat-exchanger.

The cooling of the supplementary cooling gas in the evaporator of the refrigerating machine can be economically effected by contra-flow with refrigerant evaporating under pregressively increasing partial pressures of refrigerant into an atmosphere of inert gas, whereby a range of temperatures is produced in the evaporator.

An important result is obtained if the supplementary cooling of the compressed air is effected with a refrigerating apparatus reaching a temperature as low as —130° C., because below this temperature very little contra-flow cooling with the expanded gases is required to reach the critical point of air (—140° C.) at which temperature the latent heat of evaporation of air is nil and the air passes straight away into the liquid state if the pressure is above that of the critical point. This considerably shortens the starting up time of the plant and reduces to a large extent the motive power required. In the Linde double stage expansion process for the production of liquid air, supplementary cooling, to —130° C. enables the motive power required for the liquefaction of air to be reduced to one third of that required with the methods hitherto used.

Representative examples of plants embodying the invention are illustrated diagrammatically on the accompanying drawings, in which:

Fig. 1 is a sectional elevation of a known air liquefying and oxygen rectifying plant, but with supplementary cooling by means of a diffusion refrigerating machine.

Fig. 2 is a sectional elevation of another type of known air liquefying plant, but with supplementary cooling.

Referring to Fig. 1, $a$ is a two-stage air compressor in which air is compressed to a pressure of 40 atmospheres. From the compressor $a$ the compressed air passes along a pipe $b^1$ to one end of a heat-exchanger $b$. From the other end of the heat-exchanger $b$ the compressed air passes by a pipe $c^1$ to one end of a second heat-exchanger $c$. From the other end of the second heat-exchanger $c$ the compressed air passes by a pipe $d^1$ to a pipe coil $d$ located in the bottom of the lower, pressure, column $e$ of a double oxygen rectifier $e, f$, of which $f$ is the upper column.

The compressed air by its passage through the two heat-exchangers $b$ and $c$ becomes cooled, as hereinafter described, to a liquefying temperature, and in fact being at 40 atmospheres some becomes liquefied in the second heat-exchanger $c$.

From the coil $d$ the compressed air passes by a pipe $g^1$ having an expansion valve $g^2$ to an expansion nozzle $g$, located in and through which the air is discharged into the lower rectifying column $e$, at a pressure of about 5 atmospheres absolute. The resultant lowering of the temperature causes liquefaction of a further part of the air.

The nozzle $g$ is situated partway up the column $e$ and the liquid air produced at and delivered by the nozzle $g$, falls over baffle plates $e^1$ in the column $e$ to the bottom of the column $e$, where the coil $d$ traversed by the compressed air on its way to the nozzle $g$ is located. The air in this coil $d$ being at a higher temperature than the liquefied gas at the bottom of the column $e$ and such liquefied gas being at a lower pressure, causes part of the liquefied gas to boil. Some of the compressed air in the coil $d$ simultaneously liquefies, so that during normal running actually a mixture of liquid and gaseous air issues from the expansion nozzle $g$ into the rectifying column $e$, some of the liquid having already been formed in the heat-exchanger $c$.

The vapours arising from the liquid boiling at the bottom of the rectifying column $e$, pass upwards past the baffle plates $e^1$, and by the time they reach the top of the lower column $e$, they have become so rectified as to consist practically of nitrogen.

The top of the lower rectifying column $e$ opens into and is closed by a tubular reflux condenser $h$, some of the tubes of which return liquid to the column $e$ and others, on the periphery, deliver liquid to a trough $h^1$. The tubes of the reflux condenser $h$ are surrounded and cooled by liquid oxygen boiling at the bottom of the upper rectifying column $f$. The pressure of 5 atmospheres existing in the lower column $e$ is sufficiently high to cause nitrogen vapour to condense in the tubes of the condenser $h$. About half the liquid nitrogen so produced flows back down the lower rectifying column $e$ and washes oxygen from the ascending vapours, whilst the remainder collects in the trough $h^1$. The liquid nitrogen collected in the trough $h^1$, is forced by the pressure reigning in the column $e$ past an expansion valve $i^1$ along a pipe $i^2$ to a nozzle $i$, at and whereby it is delivered into the top of the upper rectifying column $f$. The liquid collecting at the bottom of the lower rectifying column $e$ and which consists of about 40% of oxygen, is also forced by the pressure past an expansion valve $j^1$ along a pipe $j^2$ to a nozzle $j$, at and whereby it also is delivered into the upper rectifying column $f$, but at an intermediate height therein.

The nitrogen and oxygen expand approximately to atmospheric pressure on entering the upper rectifying column $f$, wherein the rectification is so completed, the liquids falling on baffle plates $f^1$, that the liquid which collects at the bottom of the upper rectifying column $f$ is practically pure oxygen. As already mentioned, this liquid oxygen in boiling cools the reflux condenser $h$.

Liquid oxygen overflows by a pipe $k^1$ from the bottom of the upper rectifying column $f$ into a tank $k$ from which it can be drawn off in the liquid condition along a pipe $k^2$ past a stop cock $k^3$.

Some of the oxygen passes as gas by the pipe $k^1$ to the tank $k$ and therefrom by a pipe $k^4$ to the second heat-exchanger $c$, along which it flows in contra-flow with the compressed air. From the heat-exchanger $c$ the expanded oxygen gas passes by a pipe connection $k^5$ to the first heat-exchanger $b$ along which it flows likewise in contra-flow with the compressed air, finally being delivered or escaping past a stop cook $k^6$.

The expanded nitrogen flows as gas from the top of the upper rectifying column $f$, along a pipe $l$, in heat-exchange proximity with the liquid nitrogen pipe $i^2$, to the second heat-exchanger $c$ along which it flows in contra-flow with the compressed air. From the heat-exchanger $c$ the expanded nitrogen passes by a pipe connection $l^1$ to the first heat-exchanger $b$ along which it flows likewise in contra-flow with the compressed air, to an outlet $l^2$ for excess nitrogen gas.

The expanded oxygen and nitrogen flowing in contra-flow with the compressed air exert a cooling effect on the latter, which for the reasons given above it is desirable to amplify. For this purpose expanded nitrogen after traversing the heat-exchanger $b$, is taken by a fan or rotary compressor $m^1$ and sent through a pipe $m$ which extends through the evaporator $n$ of a diffusion refrigerating machine. Here the expanded nitrogen is cooled to the temperature of the nitrogen entering the heat-exchanger $b$ by the pipe $l^1$ interconnecting the heat-exchangers $b$ and $c$. After extending through the evaporator $n$ the pipe $m$ is connected to the heat-exchanger $b$ at the same end as and conjointly with the nitrogen pipe connection $l^1$. The cooling effect of the expanded nitrogen gas exerted in the heat-exchanger $b$, on and in contra-flow with the compressed air, can be so increased by the refrigeration of a portion of the expanded nitrogen gas in the evaporator $n$, that the temperature gradient between the compressed air and the nitrogen gas and expanded oxygen gas in the heat-exchanger can be quite small, merely sufficient to effect heat-transmission.

The diffusion refrigerating machine of which the evaporator $n$ is a part, comprises a boiler $o$, heated by a steam coil $o^1$, with an upper rectifier chamber cooled by a water-cooled coil $o^2$, a condenser $p$ cooled by a water-cooled coil $p^1$, and an absorber $q$, cooled by a water-cooled coil $q^1$. An inert gas atmosphere is circulated through the absorber $q$ and evaporator $n$ by a fan $q^2$ and pipes $q^3$ and $n^1$ interconnecting the respective ends of the absorber $q$ and evaporator $n$. The liquid refrigerant supplied by a pipe $p^2$ from the condenser $p$ and entering the evaporator $n$ by a rose pipe $n^2$, evaporates into the inert gas atmosphere in the evaporator $n$, under a progressively increasing partial pressure. In consequence a progressively increasing range of temperatures is produced in the evaporator $n$. These temperatures extend for instance from $-110°$ C. or $-100°$ C. at the inlet end of the evaporator $n$ to $+15°$ C. at the outlet end thereof. The nitrogen in the pipe $m$ flows in contra-flow with the inert gas in the evaporator $n$, and therefore is appropriately subjected to the range of temperatures of the evaporator.

The inert gas pipe $q^3$ interconnecting the top of the absorber $q$ and the inlet end of the evaporator $n$, and also the liquid refrigerant supply pipe $p^2$, are so extended through the evaporator $n$ that the inert gas from the absorber and the liquid refrigerant pass in contra-flow with and are progressively cooled by the inert gas and the evaporation of refrigerant in the evaporator before being delivered to the inlet end of the evaporator.

The strong liquor from the absorber $q$ is sent by a pump $q^5$ through a pipe $q^6$, a heat-exchanger $q^7$ and a pipe $q^8$ to the boiler $o$. The weak liquor is delivered from the boiler $o$ through a pipe $o^3$, the heat-exchanger $q^7$ and a pipe $o^4$ to the absorber $q$.

The diffusion absorption refrigerating machine may be a resorption machine, in which case the refrigerant liquid will be strong absorption liquor instead of liquid refrigerant.

Instead of the refrigerating machine cooling a returned portion of the nitrogen gas, some of the compressed air supplied by the compressor $e$ could be diverted from passing through the heat-exchanger $b$ and instead passed in direct contra-flow heat-exchange with the evaporator $n$. Such direct cooling of the compressed air by the evaporator will be more efficient than indirect cooling by the lower pressure nitrogen, owing to the higher coefficient of heat transmission of the compressed air due to its greater density. Alternatively the evaporating refrigerant in the evaporator $n$ can cool the heat-exchanger $b$ directly by locating the heat-exchanger $b$ in direct contra-flow heat-exchange proximity with the evaporator $n$.

Instead of the coils $o^2$, $p^1$ and $q^1$ being cooled by water they may be cooled by brine cooled by another refrigerating machine, thus providing a well known cascade refrigerating arrangement.

Fig. 2 illustrates the application of the invention to another type of liquid air plant wherein the air is expanded in two stages, and the expanded air from the first stage is returned to an appropriate intermediate stage of the compressor. This is economical as the major portion of the air remains unliquefied at the first expansion stage and therefore the major portion of the air has to be recompressed from only an intermediate pressure.

$a$ is a two-stage compressor which delivers compressed air by a pipe $s$ past an expansion valve $s^1$ to a chamber $t$ where it expands to an intermediate pressure. From the chamber $t$ a pipe $u$ leads the expanded air back to an intermediate stage of the compressor $a$. The pipe $u$ is in heat-exchange proximity with the pipe $s$ supplying the compressed air to the chamber $t$ and the expanded air and compressed air pass in contra-flow along the respective pipes.

Some of the expanded compressed air becomes liquefied in the chamber $t$ and this is led by a pipe $v$ past an expansion valve $v^1$ into the second stage expansion chamber $w$. In the chamber $w$ some of the air evaporates and is led by a pipe $x$ in contra-flow with the liquid air in the pipe $v$ and the compressed air in the pipe $s$ to an outlet $x^1$.

Liquid air can be drawn off from the chamber $w$ by a pipe $w^1$ closed by a stop cock $w^2$.

The above described contra-flow heat-exchange cooling of the compressed air is usual in this type of liquid air plant, and is supplemented by air driven by a fan $y$ along a pipe $z$ extending in heat-exchange proximity with an evaporator $n$ of a refrigerating machine or other cooling apparatus. The pipe $z$ delivers the so-cooled air into the pipe $x$ at a point where the temperature of the air in the pipe $x$ is the same as that to which the air in the pipe $z$ has been cooled.

The pressure to which the air is compressed by the compressor $a$ in the plant according to Fig. 3, is for instance 80 atmospheres, the first stage of expansion in the chamber $t$ is to 20 atmospheres, and the second stage of expansion in the chamber $w$ is to 5 atmospheres absolute. The supplemented contra-flow cooling is effected for instance over a continuous temperature range of from $-115°$ C. to $+20°$ C., with for instance a constant temperature difference of only $5°$ C. throughout the range.

In the type of liquid air plant illustrated diagrammatically in Fig. 2 the air hitherto has usually been compressed to 200 atmospheres. The supplementary cooling enables the plant to be efficiently operated with the air compressed, as above stated, to only 80 atmospheres, and in much smaller quantities, to produce the same yield of liquid air. This effects obvious economy of motive power.

Although the invention has been described as applied to liquid air and oxygen rectifying plants, the invention is also applicable to the liquefaction and separation of other mixtures of gases, such as for instance the separation of hydrogen from carbon monoxide, hydrocarbon gas mixtures, water gas and like mixtures of gases having low liquefaction temperatures.

I claim:

1. In the method of liquefying gases by compressing and expanding gas and cooling said compressed gas by contra-flow heat-exchange with the expanded gas, producing cold along a range of increasing temperatures by evaporating a refrigerant under increasing partial pressures of refrigerant in an insert gas, re-cooling expanded gas after said contra-flow heat-exchange by contra-flow heat-exchange with said so-cooled inert gas, and returning said re-cooled gas to contra-flow heat-exchange with said compressed gas at the point of same temperature.

2. In the method of liquefying gases by compressing and expanding gas and cooling said compressed gas by contra-flow heat-exchange with the expanded gas, precooling an inert gas by contra-flow heat-exchange with a preceding portion of such inert gas and a refrigerant evaporated thereinto, evaporating further refrigerant under increasing partial pressures of refrigerant and over a range of increasing temperatures into said precooled inert gas, and cooling at least a portion of said compressed gas by absorption of heat therefrom at temperatures along said range of temperatures by said precooled inert gas and said refrigerant evaporating thereinto under said increasing partial pressures.

3. In the method of liquefying gases by compressing and expanding gas and cooling said compressed gas by contra-flow heat-exchange with the expanded gas, precooling a liquid refrigerant and an inert gas by contra-flow heat-exchange with a preceding portion of such inert gas and a refrigerant evaporated thereinto, evaporating said precooled refrigerant under increasing partial pressures of refrigerant and over a range of increasing temperatures into said precooled inert gas, and cooling at least a portion of said compressed gas by absorption of heat therefrom at temperatures along said range of temperatures by said precooled inert gas and said precooled refrigerant evaporating thereinto under said increasing partial pressures.

GUIDO MAIURI.